United States Patent Office 3,313,639
Patented Apr. 11, 1967

3,313,639
CELLULOSE ACYL ESTER FILM-FORMING COMPOSITION
Frederick M. Ball and John H. Davis, Kingsport, Tenn., assignors to Eastman Kodak Company, Rochester, N.Y., a corporation of New Jersey
No Drawing. Filed Aug. 28, 1963, Ser. No. 305,200
3 Claims. (Cl. 106—171)

This invention relates to cellulose ester compositions, and more particularly to films and coatings based on cellulose esters.

In Industrial and Engineering Chemistry, volume 46, September 1954, page 15A, compositions were disclosed comprising cellulose esters, such as cellulose acetate butyrate, plasticized with acetylated monoglycerides, such as acetylated monoglycerides prepared from lard. While these compositions have found utility in various applications, the films and coatings prepared from these compositions are hazy at low temperatures and do not have good film strength. These disadvantages are such that coatings and films prepared from these compositions are not entirely satisfactory for certain uses, such as for packaging food products which are to be stored at low temperatures. It is desirable in certain uses that cellulose ester compositions remain clear at low temperatures, and possess good film strength.

One object of our invention is to provide cellulose ester films having good strength. Another object of our invention is to provide cellulose ester compositions which may be formulated into films, coatings or the like, which films and coatings remain clear at low temperatures. Other objects of our invention will appear herein.

In accordance with our invention, we provide compositions comprising cellulose ester, sucrose acetate isobutyrate (SAIB) and acyl trialkyl citrate. We have found that the compositions of our invention may be formulated into films and coatings which possess good clarity even at low temperatures, and good film strength. These compositions are highly useful in wrapping food products, such as bacon, which are to be stored at low temperatures, such as $-20°$ F., and which are advantageously packaged in films which are clear at such temperatures so that the contents of the package may be easily viewed.

Our invention will be further illustrated by the following examples. Example I demonstrates the improved strength of films prepared from compositions in accordance with our invention over those prepared with cellulose esters containing acylated monoglyceride.

*Example I*

Films were prepared from two hot melt coating compositions composed of 40 parts by weight cellulose acetate propionate containing about 45% propionyl and about 2% acetyl and having a viscosity of 5 seconds (the viscosity referred to herein and in the appended claims being the standard falling ball viscosity as determined by the ASTM procedure) and 30 parts by weight acetyl triethyl citrate, one hot melt coating composition containing 30 parts by weight acetylated monoglyceride prepared from lard, and the other hot melt coating composition containing 30 parts by weight sucrose acetate isobutyrate. The tensile strength of the film containing the acetylated monoglyceride was 388 p.s.i., whereas the film in accordance with the invention containing sucrose acetate isobutyrate had a tensile strength of 1,104 p.s.i. When the films were lowered to $-20°$ F., the film containing the acetylated monoglyceride was hazy, which interfered with viewing articles through the film, whereas film in accordance with the invention containing citrate plasticizer and SAIB had excellent clarity at that temperature.

The improved film strength of citrate plasticized cellulose esters containing SAIB is demonstrated in Example II.

*Example II*

Films were prepared from hot melt coatings containing the cellulose ester described in Example I, one hot melt coating containing 60 parts by weight butyryl triisobutyl citrate and the other composition containing 30 parts by weight butyryl triisobutyl citrate plus 30 parts by weight SAIB. The film containing SAIB had a tensile strength of 905 p.s.i., whereas the other film, which did not contain SAIB, had a tensile strength of only 568. In addition, the tackiness of the film not containing SAIB was poor, whereas the film containing SAIB was essentially free from tackiness.

The cellulose esters employed in our invention advantageously contain 30–50% acyl radicals of 3–4 carbon atoms, 0–5% acetyl and a viscosity of 0.1–20 seconds. Preferably, the cellulose ester is cellulose acetate propionate containing about 43–47% propionyl, 1.5–3.5% acetyl, about 2% free hydroxyl and has a viscosity of about 5 seconds. The cellulose esters are employed in the compositions of the invention in amounts of 25–50 parts by weight, with highly useful results being achieved with compositions containing 35 parts by weight cellulose ester.

The citrate plasticizers which are employed in the compositions of our invention are the acyl trialkyl citrates wherein the acyl group and the alkyl groups each contain 1–6 carbon atoms. Particularly useful citrates include acetyl triethyl citrate, butyryl triisobutyl citrate, and acetyl tributyl citrate. The citrate plasticizers are employed in the compositions of the invention in amounts of about 20–60 parts by weight, and preferably at concentrations of about 40 parts by weight.

The sucrose acetate isobutyrate which we employ in our invention is described in U.S. Patent 2,931,802, and is employed in amounts of about 10 to about 30 parts by weight, and preferably at about 20 parts by weight.

The compositions of our invention may advantageously contain a stabilizer, such as epoxidized soybean oil, in amounts of up to 10 parts by weight of the composition. Highly useful results are obtained by incorporating this stabilizer at about 5 parts by weight of the coating composition.

The invention has been described in detail with particular reference to preferred embodiments thereof, but it will be understood that variations and modifications can be effected within the spirit and scope of the invention as described hereinabove, and as defined in the appended claims.

We claim:

1. A film having high tensile strength and excellent clarity at low temperatures, consisting essentially of weight of a cellulose ester containing 30–50% acyl radicals of 3–4 carbon atoms, 0–5% acetyl and a viscosity of 0.1 to 20 seconds; 20–60 parts by weight of acyl trialkyl citrate, said acyl groups containing 1–6 carbon atoms and said alkyl groups each containing 1–6 carbon atoms; and, 10–30 parts by weight sucrose acetate isobutyrate.

2. A film having high tensile strength and excellent clarity at low temperatures, consisting essentially of 25–50 parts by weight of a cellulose ester containing 30–50% acyl radicals of 3–4 carbon atoms, 0–5% acetyl and a viscosity of 0.1 to 20 seconds; 20–60 parts by weight of acyl trialkyl citrate, said acyl groups containing 1–6 carbon atoms and said alkyl groups each containing 1–6 carbon atoms; 10–30 parts by weight sucrose acetate isobutyrate and 0–10 parts by weight of epoxidized soybean oil.

3. A film having high tensile strength and excellent clarity at low temperatures, consisting essentially of about 35 parts by weight cellulose acetate propionate containing about 43–47% propionyl, 1.5–3.5% acetyl and having a viscosity of about 5 seconds; about 40 parts by weight of a plasticizer selected from the group consisting of acetyl triethyl citrate, acetyl tributyl citrate and butyryl triisobutyl citrate; about 20 parts by weight sucrose acetate isobutyrate; and, about 5 parts by weight epoxidized soybean oil.

References Cited by the Examiner

UNITED STATES PATENTS

| | | | |
|---|---|---|---|
| 2,950,992 | 8/1960 | Brillhart et al. | 106—195 |
| 2,963,445 | 12/1960 | Rowland et al. | 106—171 |
| 3,216,840 | 11/1965 | Rouse et al. | 106—177 |

ALEXANDER H. BRODMERKEL, *Primary Examiner.*

D. J. ARNOLD, *Examiner.*